United States Patent [19]

Stark

[11] Patent Number: 5,139,065
[45] Date of Patent: Aug. 18, 1992

[54] AUXILIARY DROP-IN TABLE TOP POWER TOOL BASE

[76] Inventor: I. Bruce Stark, 23 Woodland Ave., Luray, Va. 22835

[21] Appl. No.: 801,059

[22] Filed: Dec. 3, 1991

[51] Int. Cl.$^5$ ............................................. B27C 5/10
[52] U.S. Cl. .................................. 144/371; 144/1 F; 144/134 R; 144/134 D; 144/286 R; 409/131; 409/229
[58] Field of Search ............ 144/1 R, 1 E, 1 F, 134 R, 144/134 D, 136 R, 136 C, 137, 286 R, 371; 409/131, 228, 229

[56] References Cited

U.S. PATENT DOCUMENTS

| | | | |
|---|---|---|---|
| 2,615,479 | 10/1952 | Bearup | 144/1 |
| 2,799,305 | 7/1957 | Groehn | 144/253 |
| 3,376,787 | 4/1968 | Morganson | 144/136 C |
| 4,186,784 | 2/1980 | Stone | 83/574 |
| 4,265,283 | 5/1981 | Nash et al. | 144/286 R |
| 4,312,391 | 1/1982 | Snow | 144/1 F |
| 4,335,765 | 6/1982 | Murphy | 144/286 R |
| 4,350,193 | 9/1982 | McCambridge et al. | 144/286 R |
| 4,434,824 | 3/1984 | Bussey | 83/574 |
| 4,718,468 | 1/1988 | Cowman | 144/134 D |
| 4,774,986 | 10/1988 | LaGra | 144/1 E |
| 4,875,513 | 10/1989 | Skarsten | 83/574 |

*Primary Examiner*—W. Donald Bray
*Attorney, Agent, or Firm*—Cassidy, Vance & Tarleton

[57] ABSTRACT

An auxiliary base plate assembly for converting a portable power tool such as a router having an integral base plate and a pair of parallel guide rods affixed to the integral base plate and extending laterally from opposite sides thereof to a stationary bench-type power tool including: a work bench having a first through vertical opening in its top surrounded by an inwardly extending peripheral flange recessed below the top surface of the work bench by a predetermined distance; an auxiliary base plate member having a thickness equal to the predetermined distance and having a centrally located, vertically extending, second through opening and a pair of parallel, horizontal through bores intersecting the second through opening and positioned to receive the ends of the power tool's guide rods wherein the second through opening is shaped to receive and surround the power tool's integral base plate so as to permit mounting of the auxiliary base plate member on the power tool by insertion of the guide rods into the parallel bores and lateral shifting thereof through the power tool's integral base plate whereupon the assembled power tool and the auxiliary base plate member may be inverted and inserted into the first through opening in the work bench top for support by the inwardly extending flange; with the work bench top, and the inwardly facing surfaces of the auxiliary base plate members and the power tool's integral base plate lying in a common plane defining a work surface.

21 Claims, 4 Drawing Sheets

AUXILIARY DROP-IN TABLE TOP POWER TOOL BASE

BACKGROUND OF THE INVENTION

1. Technical Field

The present invention relates to power tools; and, more particularly, to an auxiliary power tool base assembly for usage with portable power tools, such as a router, which employ guides and guide rods wherein the auxiliary base assembly can be readily attached to the portable power tools after removal of the guide for enabling the router or other tool and the auxiliary base assembly to be inverted and dropped into a flanged opening in a work table where the opening is complementary to the auxiliary power tool base assembly so as to permit usage of a portable power tool as a stationary table top tool where the only portion of the tool extending above the plane of the work table's top is the cutting implement such as a router bit.

While the present invention finds particularly advantageous use with many conventional portable routers since such tools commonly employ guides and one or more guide rods, as the ensuing description proceeds those skilled in the art will appreciate that other portable power tools such as, merely by way of example, jig saws, circular saws and the like, can be readily modified by the tool manufacturer to incorporate one or more removable guide rods associated with the tool's integral base plate; and, therefore, the present invention can also be used in conjunction with such other modified portable power tools. That is to say, the invention is not limited to use with portable routers. Nevertheless, the invention will herein be described in a non-limiting way in conjunction with a portable power router.

2. Background Art

The prior art is replete with disclosures of a wide variety of power tools including routers and varying support mechanisms heretofore used as stationary table top support arrangements for portable power tools where only the tools' cutting implement extends above the work table top. Typical of such disclosures is that found in U.S. Pat. No. 4,774,986—LaGra wherein the patentee discloses a system more particularly shown in FIGS. 1 and 2 for supporting a router beneath the top of a stationary work table. In this arrangement the router is secured to an adapter plate by means of threaded fasteners passing through the adapter plate and into the router base plate. The adapter plate is dimensioned to drop into a complementally shaped recess in the work table top.

In McCambridge et al U.S. Pat. No. 4,350,193 assigned on its face to Central Quality Industries, Inc., a power tool accessory table is described which is said to enable mounting of a wide range of portable power tools including, for example, a router. In this construction, the router or other power tool is secured to a separable base plate which is then inverted and laid crosswise over an opening formed in a work table top where the base plate rests on a peripheral flange integral with the table top. The patent is principally directed to the flange arrangement for securing the base plate to the table top as contrasted with any specific arrangement for securing the base plate to the power tool.

Murphy U.S. Pat. No. 4,335,765 is of interest for its disclosure of a portable multi-purpose construction table. Again, the table is designed to accept a wide range of portable power tools including routers which may, as shown in FIG. 3, be clamped to the underside of the table top by L-shaped clamps.

Similarly, Nash et al U.S. Pat. No. 4,265,283 assigned on its face to the Triangle Corporation, is of interest for its disclosure of elongate channel shaped brackets and clamps for securing a router or other portable power tool to the underside of a work table. Similar arrangements are also disclosed in Stone U.S. Pat. No. 4,186,784, assigned on its face to Atlantic Container Corporation, and Groehn U.S. Pat. No. 2,799,305.

U.S. Pat. No. 2,615,479—Bearup is of incidental interest for its disclosure of a router bit mounted on a removable insert which is supported in a work table top opening; but, in this instance, the router bit is geared to a drive shaft for a table saw. Snow U.S. Pat. No. 4,312,391 is similarly of incidental interest for its disclosure of an adapter permitting mounting of a router on the arm of a radial saw.

In general, each of the foregoing proposed approaches for mounting portable routers on a stationary work table employs clamps, mounting brackets, threaded fasteners and similar devices for securing the router in place. Consequently, these devices are difficult and time consuming to assemble and disassemble. Moreover, they are not particularly stable or safe since there is a tendency for the clamps, mounting brackets, threaded fasteners and the like to loosen as a result of vibrations inherently set up during usage of the tool.

Cowman U.S. Pat. No. 4,718,468, assigned on its face to Black & Decker, Inc., while not related to devices for securing routers to a fixed work table top, is nonetheless of general interest for its disclosure of a relatively conventional present-day router construction available from a number of manufacturers. In this particular instance, the router includes a base plate to which are removably secured a pair of parallel guide rods which are here used to support a router guide.

SUMMARY OF THE INVENTION

The present invention takes advantage of the type of router construction disclosed in the aforesaid Cowman U.S. Pat. No. 4,718,468 by employing the guide rods to mount the router or other power tool on an auxiliary base plate assembly which can then be inverted and dropped into a flanged opening in a work bench table top, thereby totally eliminating the need for usage of clamps, brackets, threaded fasteners or the like which have a tendency to loosen.

More specifically, it is a general object of the present invention to provide an auxiliary router or other power tool base assembly for portable routers and the like which enables such portable tools to be supported from a work bench table top with only the router bit or other cutting implement extending above the plane of the table top, yet which does not require any separate mounting brackets, clamps or fasteners and which permits of ease of assembly and disassembly and is, at the same time, characterized by its economy, rigidity, stability and safety in operation.

To this end, the auxiliary base plate assembly of the present invention comprises a pair of complementary, mating, auxiliary base plate members each having at least one linear edge adapted to be oriented in edge-to-edge abutting relation with their abutting linear edges cut out to form a pair of generally C-shaped complementary auxiliary base members designed to fit snugly about the base plate of a conventional router or similar power tool. In the illustrative embodiment of the invention, the pair of auxiliary base plate members, when abutted together edge-to-edge, define a rectangular configuration with a central opening; but, they need not define a rectangle provided only that the resulting composite auxiliary base plate is non-circular. Each of the pair of complementary, mating, auxiliary, base plate members is provided with a pair of parallel transverse through bores extending horizontally through the auxiliary base plate members in a direction normal to the abutting edges thereof, with such bores positioned and dimensioned to receive the free projecting ends of the power tool's guide rods when the latter are generally centered with respect to the power tool base plate and affixed thereto.

Thus, the arrangement is such that in assembly the router or other tool may be placed, with its integral base plate down, on a flat horizontal surface with its two (2) parallel guide rods extending symmetrically from the integral base plate in opposite directions. The two (2) mating, auxiliary base plate members are then laid on the flat horizontal surface and moved towards the power tool's integral base plate and one another, with the guide rods being received within respective ones of the parallel transverse horizontal bores formed in the two (2) auxiliary base plate halves.

When the two (2) auxiliary base plate members have been shifted into edge-to-edge abutting relation with the power tool's integral base plate snugly received within the facing C-shaped complementary cutouts in the auxiliary base plate members, the entire assembly is inverted and the auxiliary base plate assembly defined by the two (2) mating auxiliary base plate members is positioned within a complementally shaped through opening formed in a work bench table top, such opening having an inwardly extending peripheral flange recessed below the work bench table top by a depth equal to the thickness of the auxiliary base plate. As a consequence, the router or other power tool is supported beneath the work bench table top in a rigid, stable, immovable position due to inter-engagement between the guide rods and the auxiliary base plate halves; and, the work bench table top, the upwardly facing surfaces of the auxiliary base plate halves, and the bottom of the power tool's integral base plate all lie in a smooth, uninterrupted, continuous common plane. The confining edges of the flanged recessed opening in the work bench table top serve to prevent movement of the auxiliary base plate halves relative to the table top, one another and/or the power tool's integral base plate; and, at the same time, the guide rods are retained captive within the parallel bores in the auxiliary base plate halves and are prevented from movement even under conditions where the means for o securing the guide rods to the integral base plate loosen during usage of the tool.

Thus, the arrangement is such that the auxiliary base plate members comprise a conversion assembly for quickly and easily converting a conventional portable power tool to a stationary bench-top tool wherein the tool is integrally, although separably, mounted in a work bench in a fixed immovable position relative to the work bench with the tool bit extending above the work surface defined by the bench top; yet wherein no separate clamps, brackets, screws or other fastening devices are employed and the only components required are the power tool with its guide rod(s), the auxiliary base plate members, and a work bench.

It will be understood as the ensuing description proceeds that while it is convenient to form the auxiliary base plate of two (2) complementary halves adapted to be abutted in edge-to-edge relation, it is within the scope of the invention to subdivide the auxiliary base plate into two (2) or more pieces which individually comprise more and/or less than one-half of the assembled unit. Indeed, the auxiliary base plate could be made of a single unitary piece with a central through opening adapted to accommodate a given portable power tool's integral base plate provided only that the auxiliary base plate is provided with one or more suitable transverse through bores which permit of lateral insertion of the tool's guide rod(s) through such bore(s) and the aligned guide rod opening(s) in the power tool's base plate when the latter is positioned within the through central opening in the one piece auxiliary base plate.

DESCRIPTION OF THE DRAWINGS

These and other objectives and advantages of the present invention will become more readily apparent upon reading the following Detailed Description and upon reference to the attached drawings, in which.

Figure 1:
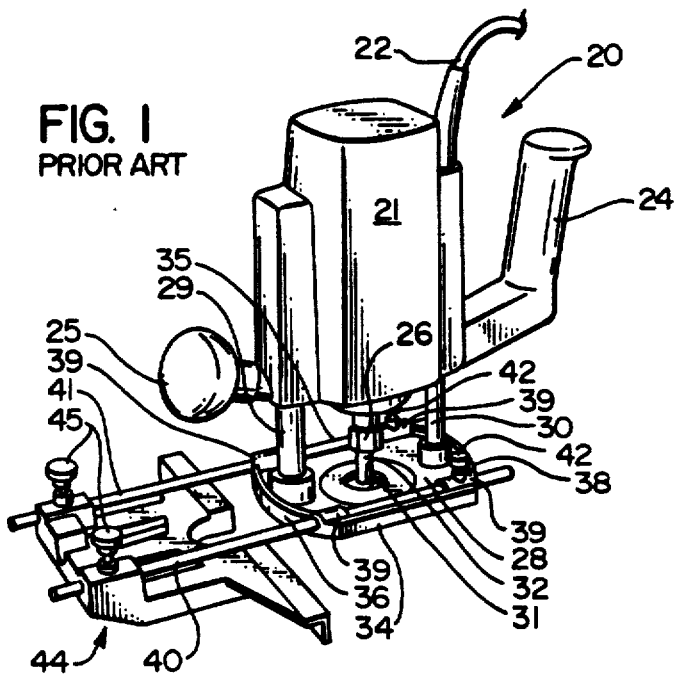
FIG. 1 is an isometric view of a conventional prior art router with an adjustable guide assembly somewhat similar to that disclosed in the aforesaid Cowman U.S. Pat. No. 4,718,468.

While the invention is susceptible of various modifications and alternative forms, a specific embodiment thereof has been shown by way of example in the drawings and will herein be described in detail. It should be understood, however, that it is not intended to limit the invention to the particular form disclosed but, on the contrary, the intention is to cover all modifications, equivalents and/or alternatives falling within the spirit and scope of the invention as expressed in the appended claims.

DETAILED DESCRIPTION

Turning now to the drawings, and directing attention first to FIG. 1, there has been illustrated a portable power tool which here takes the form of a conventional router, generally indicated at 20. As is conventional with commercially available portable routers of the type here depicted at 20, the router includes a main body 21, an electric plug-in type power cord 22, a pair of handle elements 24, 25, a drive socket 26, and an integral base plate 28, which, in this instance, is secured to the router's main body 21 by a pair of parallel, spaced apart, vertical posts 29, 30. Base plate 28 is provided with a central opening 31 coaxial with the tool's drive socket 26 for reception of a router bit 32.

In the exemplary prior art power tool 20 depicted in FIG. 1, it will be observed that the base plate 28 is configured with two (2) opposed parallel flat sides 34, 35 and a pair of opposed rounded ends 36, 38 of circular arc configuration. Base plate 28 is further provided with integral collars or sleeves 39 defining a pair of spaced passages which are parallel to the flat sides 34, 35 of the base plate 28 and which are adapted to slidably receive respective different ones of a pair of guide rods 40, 41 which can be located in selected fixed positions relative to the base plate 28 by means of thumb screws 42 or the like. As here shown, the guide rods 40, 41 are non-symmetrical with respect to the tool's integral base plate 28—i.e., they are adjusted to project laterally to the left of the router 20 as viewed in FIG. 1—and serve to support a guide assembly, generally indicated at 44, which can be adjustably mounted on the guide rods 40, 41 by means of thumb screws 45.

For all practical purposes relative to an understanding of the present invention, it will be appreciated that the conventional prior art router 20 depicted by way of example in FIG. 1 is substantially similar in design, construction and operation to that shown in the aforesaid Cowman U.S. Pat. No. 4,718,468 except that in such patent the router's integral base plate, also indicated at 28, is circular in plan view having a pair of integral oppositely directed lateral extensions defining areas where the guide rods can be fixedly, yet adjustably, secured; whereas, in the conventional router 20 depicted in FIG. 1, the base plate 28, while generally circular, has two (2) flatted sides 34, 35 with the guide rods 40, 41 being fixedly, yet adjustably, secured to the base plate 28 inboard of, and parallel with, the flatted sides 34, 35. As the ensuing description proceeds, those skilled in the art will appreciate that the particular shape of the tool's integral base plate 28 is irrelevant to the invention, provided only that the auxiliary base plate defining means of the invention is provided with a through opening, preferably complemental to, and suitable for receiving and surrounding, the particular integral base plate on the tool being used. In the illustrative form of the invention, the auxiliary base plate defining means is formed as a pair of complemental auxiliary base plate members adapted to be disposed in edge-to-edge abutting relation with the through opening defined by oppositely facing cut-outs formed in the opposed abutting edges. Consequently, where the tool's integral base plate 28 is circular, the cut-outs in the auxiliary base plate members will preferably be semi-circular; where the tool's integral base plate is square, the cut-outs will preferably be rectangular; etc.

Figure 2:
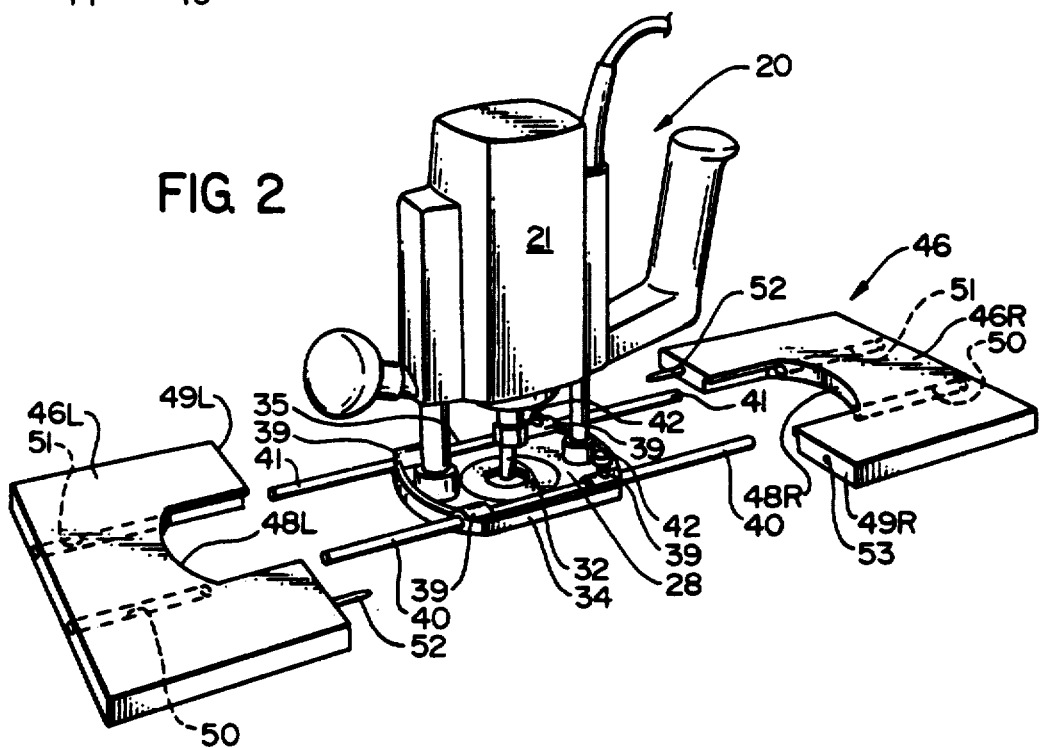
FIG. 2 is a partially exploded isometric view here depicting the router shown in FIG. 1 with the guide assembly removed and the two (2) parallel guide rods centered with respect to the router's integral base plate and located in position to be received within parallel transverse horizontal bores formed in a pair of rectangular mating auxiliary base plate members, each of which have their abutting edges cut away to form a generally C-shaped member complemental in shape to the router's integral base plate.

Thus, in accordance with one of the important aspects of the present invention, the conventional router 20 depicted in FIG. 1 is adapted for use with support means comprising an auxiliary base plate assembly, generally indicated at 46 in FIG. 2, which here takes the form of a pair of left and right mating, auxiliary base plate members 46L, 46R which are adapted to be mounted on the guide rods 40, 41 in lieu of the guide assembly 44 depicted in FIG. 1. To this end, the auxiliary base plate members 46L, 46R are provided with oppositely facing, complemental cut-outs 48L, 48R, respectively, in their respective abuttable edges 49L, 49R, which cut-outs 48L, 48R are complemental in shape to, and designed to receive and snugly enclose, the left and right portions of the tool's integral base plate 28 as viewed in FIG. 2.

As will be evident from inspection of FIG. 2, the left and right auxiliary base plate members 46L, 46R are each provided with a pair of parallel, horizontally oriented, through bores 50, 51 dimensioned and positioned to slidably receive respective ones of the left and right ends of the guide rods 40, 41 which are here shown as being affixed to the tool's integral base plate 28 and which project symmetrically to the left and right thereof. If desired, one or both of the auxiliary base plate members 46L, 46R can be provided with an additional alignment pin 52 projecting laterally from the abutting edges 49L, 49R and positioned to be received within an alignment opening or bore 53 formed in the abutting edge 49R (and 49L where the alignment bore is not visible) of the opposite auxiliary base member 49R, 49L.

The manner of assembly of the auxiliary base plate members 46L, 46R to the conventional prior art router 20 will be best understood by consideration of FIGS. 3 through 7. Thus, after removal of the guide assembly 44 (FIG. 1) from the guide rods 40, 41, centering of the guide rods 40, 41 relative to the tool's integral base plate 28, and placement of the tool's base plate 28 and the left and right auxiliary base plate members 46L, 46R on a suitable flat surface (not shown) in the manner depicted in FIG. 2, one or the other, or both, of the left and right auxiliary base plate members 46L, 46R are slidably interengaged with respective ones of the left and right projecting ends of the guide rods 40, 41 by insertion of such respective ends into the bores 50, 5 formed in the left and right auxiliary base members 46L, 46R; and, the respective auxiliary base members 46L, 46R are then slid along the guide rods 40, 41 until the left and right halves of the tool's integral base plate 28 are received in respective ones of the left and right cutouts 48L, 48R.

Figure 3:
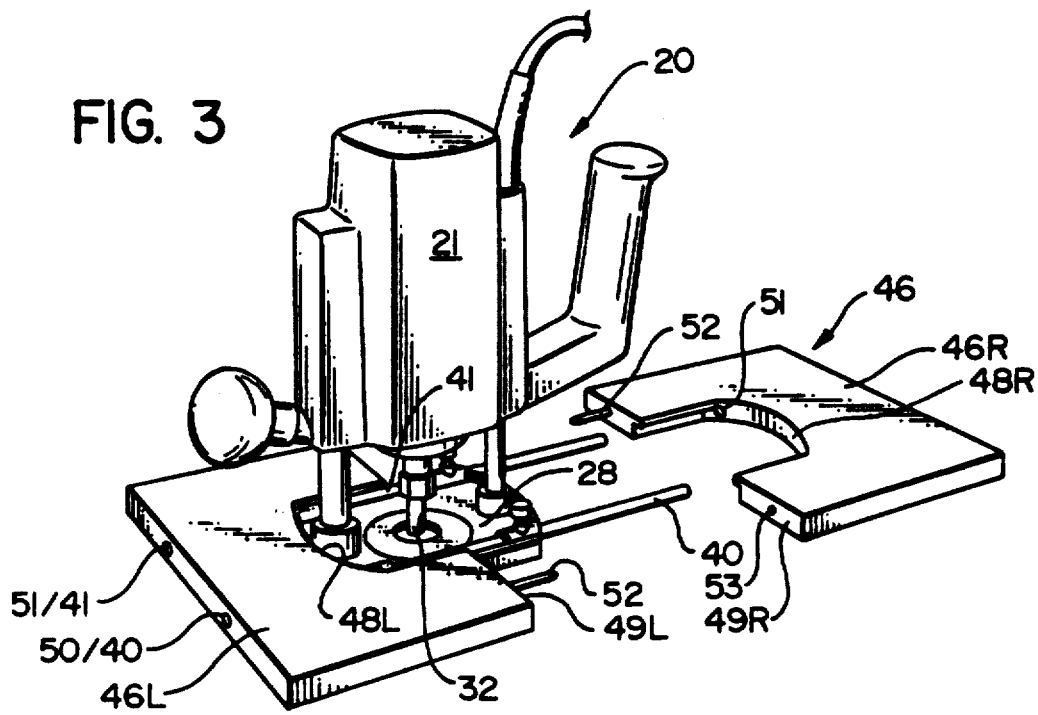
FIG. 3 is a partially exploded isometric view similar to FIG. 2, but here illustrating the router and auxiliary base plate assembly with one of the two (2) mating auxiliary base plate members mounted on the guide rods and snugly embracing one-half of the router's integral base plate while the other auxiliary base plate member is in readiness for similar assembly.
Figure 4:
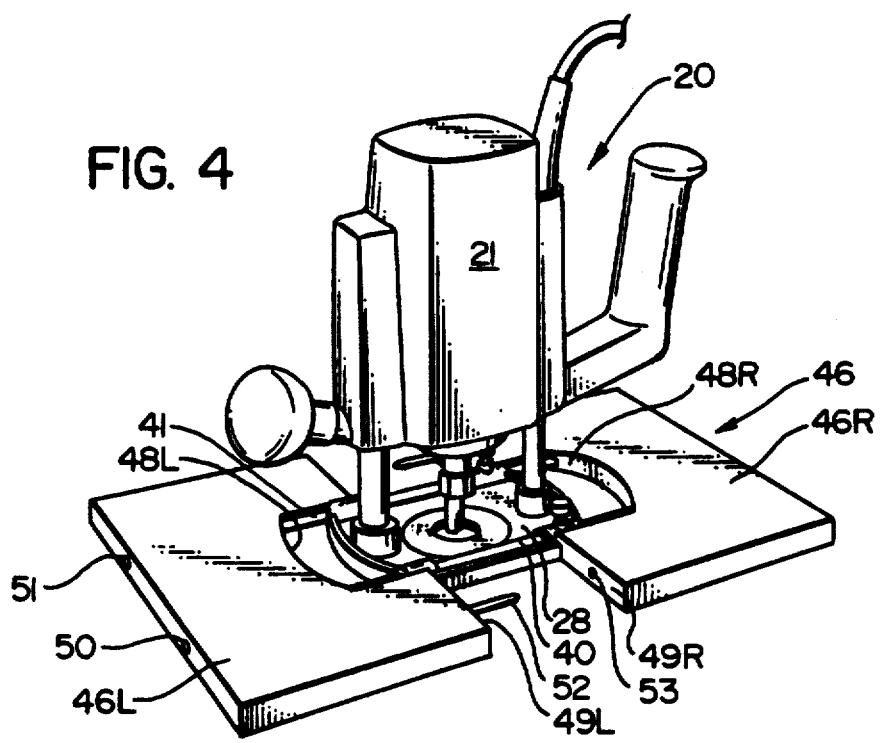
FIG. 4 is a partially exploded isometric view similar to FIGS. 2 and 3, but here illustrating the two (2) mating complemental auxiliary base plate halves partially engaged with the router's guide rods as the base plate halves are moved towards edge-to-edge abutting relation.
Figure 5:
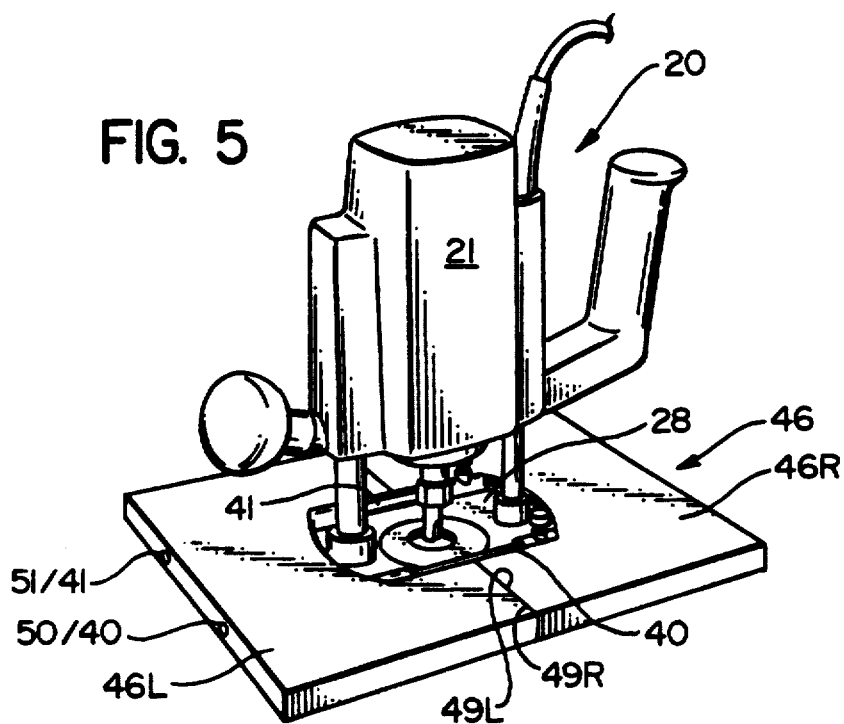
FIG. 5 is an isometric view similar to FIGS. 2 through 4, but here illustrating the two (2) auxiliary base plate halves in fully assembled condition on the router with the cutout openings in the abutting edges of the auxiliary base plate members in snug surrounding relation to the periphery of the router's integral base plate.

Considering first FIG. 3, it will be noted that the left auxiliary base plate member 46L is fully seated on the guide rods 40, 41 in snug surrounding relation to the left half of the tool's integral base plate 28; while the right auxiliary base plate member 48R is ready for assembly. In FIG. 4, it will be noted that both the left and right auxiliary base plate members 46L, 46R are partially mounted on the guide rods 40, 41 with the alignment pins 52 on the abutting edges 49L, 49R of the auxiliary base plate members positioned for insertion into the alignment bores 53 in the opposite edge 49R (the alignment bore 53 in edge 49L not being visible). Finally, and as shown in FIG. 5, the left and right auxiliary base plate members 46L, 46R are fully mounted on the guide rods 40, 41 in snug surrounding relation to the router's integral base plate 28 with their respective abuttable edges 49L, 49R in edge-to-edge abutting relation.

Figure 6:
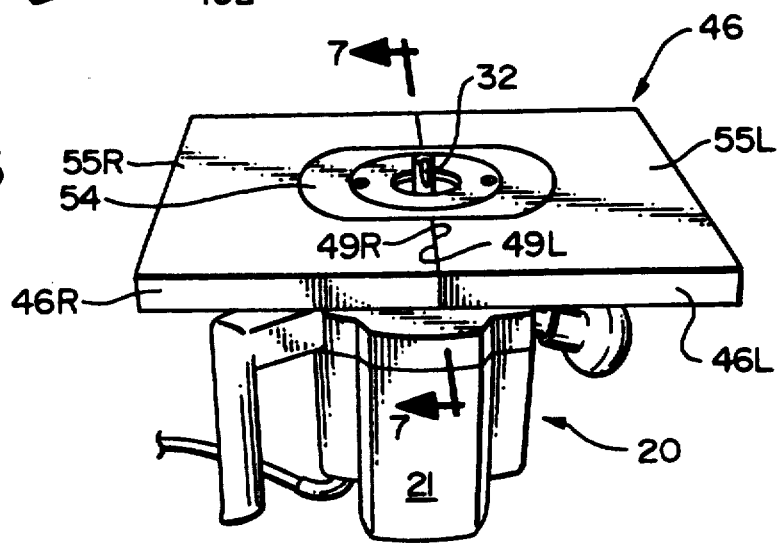
FIG. 6 is an isometric view of the router and assembled auxiliary base plate halves of FIG. 5 here depicted in an inverted state with the router bit extending vertically upward above the plane of its integral base plate and the auxiliary base plate halves.

It will, of course, be appreciated that the bores 50, 51 formed in the auxiliary base plate members 46L, 46R are positioned therein such that when the assembled router 20 and auxiliary base plate 46 are inverted as shown in FIG. 6, the lower surface 54 of the tool's integral base plate 28 and the upwardly facing surfaces 55L, 55R of the auxiliary base plate members 46L, 46R all lie in a smooth, continuous, uninterrupted common plane; and, where only the router bit 32 extends above that plane for cutting engagement with any work piece (not shown) positioned on the assembled base plate elements 28, 46L, 46R.

Figure 7:
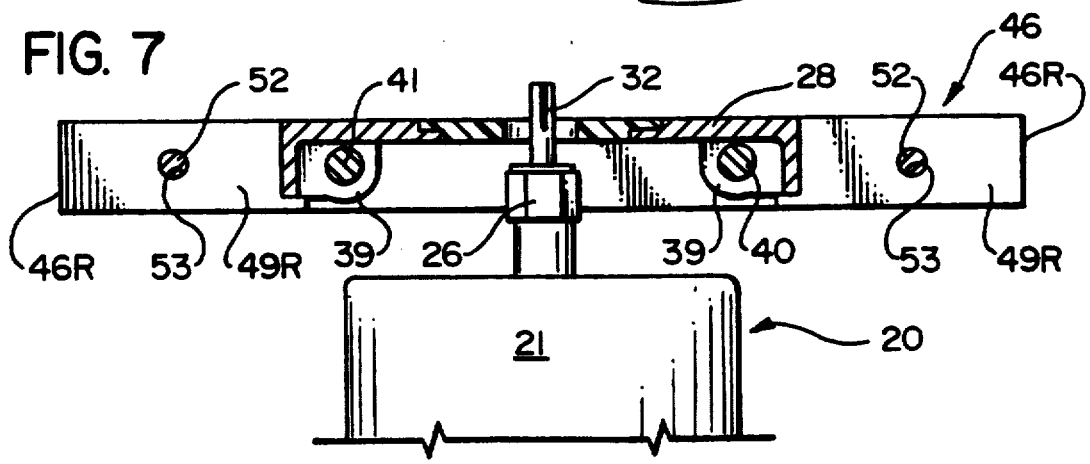
FIG. 7 is a fragmentary vertical elevation of the assembled router and one of the auxiliary base plate halves, partly in section taken substantially along the line 7—7 in FIG. 6.
Figure 8:
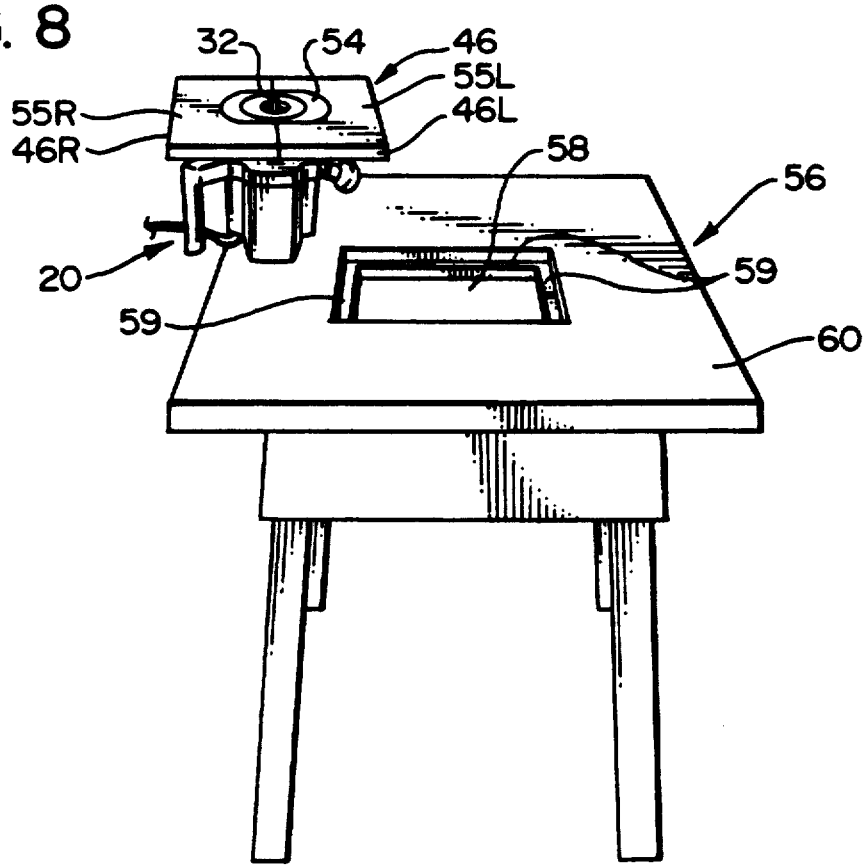
FIG. 8 is an isometric view depicting a work bench table top having a through central opening in the work bench surface surrounded by an inwardly extending recessed peripheral flange, with the inverted and assembled router and base plate halves of FIG. 6 resting on the table top in readiness to be dropped into the flanged recessed opening in the table top; and, FIG. 9 is an isometric view of the assembled router and auxiliary base plate halves after mounting in the flanged recessed opening in the work bench table top, here depicting an assemblage wherein the bottom surface of the router's integral base plate, the upwardly facing surfaces of the two (2) auxiliary base plate members, and the top surface of the work bench table top all lie in a single continuous uninterrupted plane with only the router bit extending above the table top.

The thus assembled conventional router 20 and auxiliary base plate assembly 46 as depicted in FIGS. 6 and 7 is now in readiness for drop-in mounting in a suitable work bench. Thus, as best shown in FIG. 8, a shop work bench, generally indicated at 56—which may be either a large fixed stationary work bench or a small portable work bench—is provided with a through rectangular opening 58 bounded by a peripheral flange 59 recessed beneath the work surface 60 of the work bench 56 by a depth equal to the thickness of the auxiliary base plate assembly 46. In keeping with this aspect of the invention, the flanged recessed opening 58 is designed so as to snugly receive the rectangular auxiliary base plate assembly 46 without freedom for lateral and/or rotational relative movement therebetween. In the illustrative form of the invention, this is achieved by utilizing a rectangular auxiliary base plate assembly 46 and a complemental rectangular through opening 58 in the work bench 56. However, those skilled in the art will appreciate that the auxiliary base plate assembly 46 and the complemental through opening can be of other than rectangular configuration—for example, they can be triangular, hexagonal or of other polygonal shape, or they can be ellipsoidal or any other non-circular complemental configuration—provided only that the configuration chosen precludes relative lateral and/or rotational movement therebetween, thus stabilizing the router 20.

Figure 9:
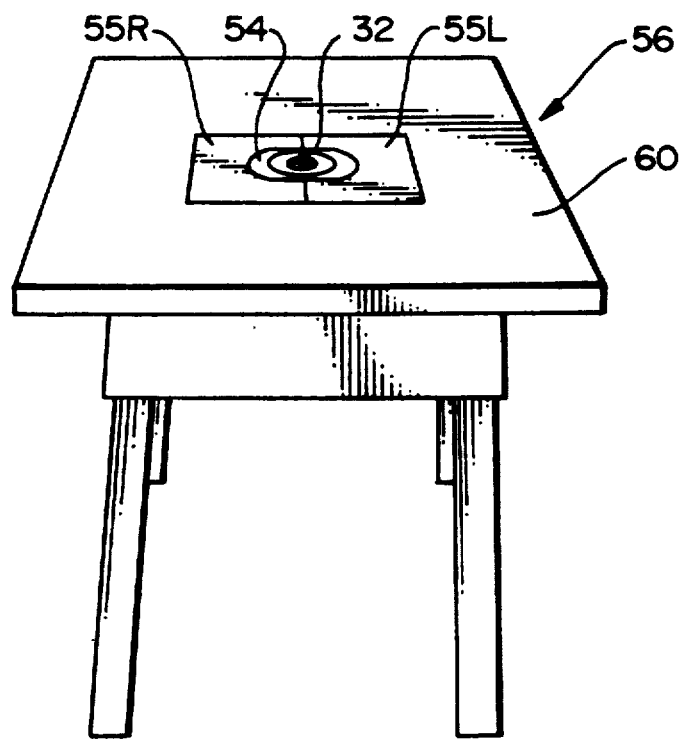

Consequently, when the assembled and inverted router 20 and auxiliary base plate assembly 46 are dropped into the flanged through opening 58, the peripheral edges of the auxiliary base plate 46 rest on, and are supported by, the work bench's peripheral flange 59 with the bottom surface 54 of the inverted router integral base plate 28, the upwardly facing surfaces 55R, 55L of the auxiliary base plate members 46R, 46L, and the upwardly facing surface 60 of the work bench 56 all lying in a smooth, continuous, uninterrupted, common horizontal plane upon which work pieces (not shown) can be placed for cutting engagement with the router's upwardly projecting router bit 32 as best shown in FIG. 9. Moreover, since the auxiliary base plate assembly 46 is snugly received within the complementally shaped flanged opening 58, movement of the auxiliary base plate members 46L, 46R, guide rods 40, 41, and router 20 relative to one another and relative to the work bench 56 is effectively precluded, even in those instances where the thumb screws 42 (FIG. 2) used to secure the tool's integral base plate 28 to the guide rods 40, 41 are loosened due to vibration of the tool in usage.

Those skilled in the art will appreciate from the foregoing Detailed Description that there has herein been disclosed a simple, yet highly effective, rugged and economical arrangement for permitting effective, rapid and easy conversion of a conventional portable power tool to a stationary table-top unit which is totally devoid of separate clamps, support brackets and similar threaded fasteners. The tool 20, auxiliary base plate assembly 46 and work bench 56 can be quickly assembled merely by: i) removal of the tool's guide assembly 44 (FIG. 1); ii) sliding the left and right auxiliary base plate members 46L, 46R onto the guide rods 40, 41; iii) inverting the tool/auxiliary base plate assembly 20/46; and iv), dropping the inverted tool/auxiliary base plate assembly 20/46 into the flanged opening 58 in the work bench 56. When it is desired to again use the power tool 20 as a portable power tool, it is merely necessary to remove the tool/auxiliary base plate assembly 20/46 from the work bench opening 58, slide the left and right auxiliary base plate members 46L, 46R off the guide rods 40, 41, and, if desired, the guide assembly 44 can be remounted on the guide rods 40, 41.

I claim:

1. An auxiliary base plate assembly for converting a conventional portable power tool of the type having an integral base plate and one or more guide rods affixed to the integral base plate and projecting laterally therefrom to an inverted stationary table-top tool, said auxiliary base plate assembly comprising, in combination:

a) means defining an auxiliary base plate member having a centrally located through opening formed therein, said through opening shaped and dimensioned to receive and snugly surround at least a portion of the periphery of the power tool's integral base plate; and, b) at least one horizontal through bore formed in said auxiliary base plate member defining means with each said at least one bore intersecting said through opening and positioned to receive the laterally projecting ends of the one or more guide rods affixed to the power tool's integral base plate;

whereby, said auxiliary base plate member defining means can be: i) positioned in surrounding relation to the power tool's integral base plate; and ii), coupled to the power tool by inserting the ends of the one or more guide rods into the horizontal bores in the auxiliary base plate defining means and laterally through the power tool's integral base plate with said through opening in said base plate member defining means receiving, and snugly surrounding, at least a portion of the tool's integral base plate and with the bottom surface of the integral base plate lying in a common unitary plane with the surface of the auxiliary base plate member defining means which faces upwardly when installed on a portable power tool and the tool and auxiliary base plate assembly are inverted.

2. An auxiliary base plate assembly as set forth in claim 1 wherein said auxiliary base plate member defining means comprises at least a pair of first and second auxiliary base plate members respectively having first and second complementary edges adapted to be disposed in edge-to-edge abutting relation, said centrally located through opening is defined by cut-out portions formed in said first and second complementary edges, and said at least one horizontal through bore is defined by axially aligned through bores formed in said first and second auxiliary base plate members normal to said first and second edges, whereby, said first and second auxiliary base plate members can be: i) disposed on opposite sides of the power tool's integral base plate; ii) slidably mounted on the free projecting ends of the one or more guide rods by inserting such rod ends in said through horizontal bores; and iii), shifted laterally towards one another and into edge-to-edge abutting relation with said cut-out portions receiving, and snugly surrounding, at least a portion of the tool's integral base plate and with the bottom surface of the integral base plate lying in a common unitary plane with the surfaces of said first and second auxiliary base plate members which face upwardly when installed on a portable power tool and the tool and auxiliary base plate assembly are inverted.

3. An auxiliary base plate assembly as set forth in claim 2 wherein a pair of parallel horizontal through bores are formed in each of said first and second auxiliary base plate members, said pairs of parallel through bores being positioned in each of said first and second auxiliary plate base members so as to be capable of receiving and being slidably mounted on a corresponding pair of parallel guide rods projecting laterally from opposite sides of the power tool's integral base plate.

4. An auxiliary base plate assembly as set forth in claim 2 further including cooperable alignment means formed in said first and second edges of said first and second auxiliary base plate members for maintaining said members in a common plane when disposed in edge-to-edge abutting relation.

5. An auxiliary base plate assembly as set forth in claim 2 Wherein said first and second auxiliary base plate members when disposed in edge-to-edge abutting relation define an auxiliary base plate assembly having a non-circular peripheral configuration with a central opening defined by said cut-out portions which is complemental in shape to the outer periphery of the power tool's integral base plate.

6. An auxiliary base plate assembly as set forth in claim 5 wherein said non-circular peripheral configuration is polygonal.

7. An auxiliary base plate assembly as set forth in claim 6 wherein said polygonal configuration is rectilinear.

8. A portable power tool to stationary table-top tool conversion assembly for use with a conventional portable power tool of the type having an integral base plate and one or more guide rods affixed to the integral base plate and projecting laterally therefrom, said conversion assembly comprising, in combination:
a) a work bench having a horizontally disposed bench top defining a work surface;
b) said bench top having a non-circular vertically extending first through opening formed therein;
c) means defining a peripheral flange on said bench top surrounding said first through opening and projecting inwardly from the edges of said work bench defining said through opening, said peripheral flange defining means being disposed beneath said work surface by an amount sufficient to form a recess of a predetermined depth;
d) means defining an auxiliary base plate member having a thickness equal to said predetermined depth;
e) said auxiliary base plate member defining means having a centrally located second through opening extending vertically therethrough, said second through opening shaped and dimensioned to receive, and snugly surround, at least a portion of the periphery of the power tool's integral base plate;
f) at least one horizontal through bore formed in said auxiliary base plate member defining means with each said at least one bore intersecting said second through opening and positioned in said auxiliary base plate member defining means to receive the laterally projecting ends of the at least one guide rod affixed to the power tool's integral base plate, so as to permit said auxiliary base plate member defining means to be: i) positioned in surrounding relation to the portable power tool's integral base plate; and ii), coupling of the auxiliary base plate member defining means to the portable power tool by insertion of the ends of the at least one guide rod into said through horizontal bores in said base plate member defining means and laterally through the portable power tool's integral base plate with said second through opening receiving, and snugly surrounding, at least a portion of the power tool's integral base plate and with the bottom surface of the integral base plate lying in a common plane with the upwardly facing surface of the auxiliary base plate member defining means when the latter is installed on the power tool and the power tool and auxiliary base plate member defining means are inverted; and,
g) said auxiliary base plate member defining means forming an auxiliary base plate having a non-circular shape complemental to the non-circular shape of said first through opening in said work bench top;

whereby, when said portable power tool and said installed auxiliary base plate member defining means are inverted and dropped into said first through opening in said work bench, said auxiliary base plate member defining means is supported on said peripheral flange defining means and precluded from lateral and/or rotational movement by interengagement with the edges of said work bench defining said first through opening and wherein said work surface, the upwardly facing surface of said auxiliary base plate member defining means, and the bottom surface of the power tool's integral base plate all reside in a common plane.

9. A power tool conversion assembly as set forth in claim 8 wherein said auxiliary base plate member defining means comprises at least a pair of first and second auxiliary base plate members respectively having first and second complementary edges adapted to be disposed in edge-to-edge abutting relation, said centrally located second through opening is defined by cut-out portions formed in said first and second complementary edges, and said at least one horizontal through bore is defined by axially aligned through bores formed in said first and second auxiliary base plate members normal to said first and second edges, thereby permitting said first and second auxiliary base plate members to be: i) disposed on opposite sides of the portable power tool's integral base plate; ii) slidably mounted on the free projecting ends of the at least one guide rod by inserting such rod ends into said through horizontal bores; and iii), shifted laterally towards one another and into edge-to-edge abutting relation with said cut-out portions receiving, and snugly surrounding, at least a portion of the power tool's integral base plate and with the bottom surface of the integral base plate lying in a common plane with the upwardly facing surface of the auxiliary base plate members when the latter are installed on the power tool and the power tool and auxiliary base plate members are inverted.

10. A power tool conversion assembly as set forth in claim 8 wherein the portable power tool comprises a router.

11. A power tool conversion assembly as set forth in claim 9 wherein a pair of parallel horizontal through bores are formed in each of said first and second auxiliary base plate members, said pairs of parallel through bores being positioned in each of said first and second auxiliary base plate members so as to be capable of receiving and being slidably mounted on a corresponding pair of parallel guide rods projecting laterally from opposite sides of the power tool's integral base plate.

12. A power tool conversion assembly as set forth in claim 9 further including cooperable alignment means formed in said first and second edges of said first and second auxiliary base plate members for maintaining said members in a common plane when disposed in edge-to-edge abutting relation.

13. A power tool conversion assembly as set forth in claim 9 wherein said non-circular first through opening in said bench top and said complemental non-circular shape of said first and second auxiliary base plate members are each polygonal.

14. A power tool conversion assembly as set forth in claim 13 wherein said polygonal first through opening and said complemental polygonal shape of said first and second auxiliary base plate members are rectilinear.

15. The method of converting a portable power tool of the type having an integral base plate and at least one guide rod extending laterally from opposite sides of the integral base plate to a stationary table top power tool, said method comprising the steps of:
  a) positioning an auxiliary base plate member having a centrally located first through opening formed therein complemental in shape to at least a portion of the outer periphery of the portable power tool's integral base plate in surrounding relation to the tool's integral base plate and wherein the auxiliary base plate member is formed with at least one horizontal through bore intersecting the first through opening and positioned and dimensioned to receive the at least one guide rod extending laterally from opposite sides of the power tool's integral base plate;
  b) inserting the projecting ends of the at least one guide rod into the at least one bore formed in the auxiliary base plate member;
  c) shifting the at least one guide rod laterally through the auxiliary base plate member and through the portable power tool's integral base plate which is positioned in, and snugly surrounded by, the first through opening formed in the auxiliary base plate member;
  d) inverting the portable power tool and the auxiliary base plate member mounted thereon; and,
  e) inserting the inverted portable power tool and the auxiliary base plate member mounted thereon into a flanged, vertically extending, second through opening formed in a work bench top with the auxiliary base plate member being supported on the flange surrounding the second through opening in the table top and wherein the table top, the upwardly facing surface of the auxiliary base plate member, and the upwardly facing surface of the integral base plate on the inverted power tool all lie in a common plane defining a work surface.

16. The method as set forth in claim 15 wherein the auxiliary base plate member is defined by at least a pair of first and second auxiliary base plate members respectively having first and second complementary edges adapted to be disposed in a common plane in edge-to-edge abutting relationship and wherein the centrally located first through opening is formed by first and second cut-out portions in respective ones of the first and second complementary edges and the at least one horizontal through bore is normal to the first and second complementary edges; and, wherein:
  i) during step (a) the first and second auxiliary base plate members are positioned in the plane of, and on opposite sides of, the portable power tool's integral base plate;
  ii) during step (b) the projecting ends of the at least one guide rod are inserted into the at least one bore formed in each of the first and second auxiliary base plate members; and,
  iii) during step (c) the first and second auxiliary base plate members are shifted laterally towards one another along the at least one guide rod until the first and second auxiliary base plate members are in edge-to-edge abutting relation with the portable power tool's integral base plate being positioned in, and snugly surrounded by, the cut-out portions formed in the first and second auxiliary base plate members.

17. The method as set forth in claim 15 wherein the portable power tool is a router.

18. The method as set forth in claim 16 wherein the portable power tool has a pair of parallel guide rods extending laterally from opposite sides of the integral base plate, the first and second auxiliary base plate members each have a pair of parallel horizontal through bores positioned and dimensioned to receive the free ends of the pair of guide rods, the free ends of the pair of parallel guide rods on one side of the power tool's integral base plate are inserted into the pair of parallel bores in the first auxiliary base plate member, and the free ends of the pair of parallel guide rods on the opposite side of the power tool's integral base plate are inserted into the pair of parallel bores in the second auxiliary base plate.

19. The method as set forth in claim 16 wherein the first and second auxiliary base plate members when abutted edge-to-edge define an auxiliary base plate assembly having a non-circular peripheral configuration and the flanged second through opening in the work bench top has a complementary non-circular peripheral configuration.

20. The method as set forth in claim 19 wherein the complemental non-circular peripheral configurations are polygonal.

21. The method as set forth in claim 19 wherein the complemental non-circular peripheral configurations are rectilinear.

* * * * *